United States Patent
Skelley et al.

(10) Patent No.: US 7,862,787 B1
(45) Date of Patent: Jan. 4, 2011

(54) HEAT RECOVERY DEVICE FOR A BOILER

(75) Inventors: Arthur P. Skelley, New Kensington, PA (US); Alan L. Stehman, Pittsburgh, PA (US); Steven G. Rendos, Lower Burrell, PA (US)

(73) Assignee: Cannon Boiler Works, Inc., New Kensington, PA (US)

( * ) Notice: Subject to any disclaimer, the term of this patent is extended or adjusted under 35 U.S.C. 154(b) by 0 days.

(21) Appl. No.: 12/456,737

(22) Filed: Jun. 22, 2009

(51) Int. Cl.
*B01D 53/34* (2006.01)
*B01D 53/36* (2006.01)
*B01D 53/74* (2006.01)

(52) U.S. Cl. ............ 423/210; 423/235; 423/239.1; 422/168; 422/173; 422/176; 422/177; 422/180; 422/187; 422/198

(58) Field of Classification Search ......... 423/210, 423/235, 239.1; 422/168, 173, 176, 177, 422/180, 187, 198
See application file for complete search history.

(56) References Cited

U.S. PATENT DOCUMENTS

| | | | |
|---|---|---|---|
| 3,699,748 A | 10/1972 | Barkovitz | 55/223 |
| 3,964,875 A * | 6/1976 | Chang et al. | 422/176 |
| 4,003,711 A | 1/1977 | Hishinuma et al. | 23/288 F |
| 4,350,669 A | 9/1982 | Izumi et al. | 423/235 |
| 4,380,529 A | 4/1983 | Gupta | 422/220 |
| 5,061,467 A | 10/1991 | Johnson et al. | 423/242 |
| 5,185,998 A * | 2/1993 | Brew | 60/299 |
| 5,198,196 A | 3/1993 | Jones, Jr. | 422/219 |
| 5,206,002 A | 4/1993 | Skelley et al. | 423/235 |
| 5,316,737 A | 5/1994 | Skelley et al. | 422/170 |
| 5,389,343 A | 2/1995 | Gentry | 422/191 |
| 5,516,499 A | 5/1996 | Pereira et al. | 423/245.3 |
| 6,162,409 A | 12/2000 | Skelley et al. | 423/239.1 |
| 6,348,178 B1 | 2/2002 | Sudduth et al. | 423/235 |
| 7,097,814 B2 | 8/2006 | Shishido et al. | 422/176 |
| 7,223,372 B2 | 5/2007 | Wakasa et al. | 422/168 |
| 7,303,730 B2 | 12/2007 | Shishido et al. | 422/177 |
| 2005/0118084 A1* | 6/2005 | Cichanowicz | 423/239.1 |
| 2005/0180905 A1* | 8/2005 | Cichanowicz | 423/239.1 |
| 2005/0232838 A1* | 10/2005 | Cichanowicz | 423/239.1 |

* cited by examiner

*Primary Examiner*—Timothy C Vanoy
(74) *Attorney, Agent, or Firm*—Price & Adams

(57) ABSTRACT

A boiler conveys an exhaust gas stream to a heat recovery device. The heat recovery device includes an air straightener, a heat recovery unit or feedwater heater, and a catalyst assembly positioned between the air straightener and the feedwater heater. The catalyst assembly has a catalyst drawer or bed that holds a quantity of catalyst materials for removing contaminants from the exhaust gas stream. The air straightener has a plurality of baffles that are arranged in a manner that optimizes the performance of the catalyst drawer or bed. The baffles also prevent condensation from leaking from the feedwater heater into the boiler. The feedwater heater recovers a quantity of heat from the exhaust gas stream.

44 Claims, 5 Drawing Sheets

HEAT RECOVERY DEVICE FOR A BOILER

BACKGROUND OF THE INVENTION

1. Field of the Invention

This invention relates to a heat recovery device for a boiler assembly and, more particularly, to a method and apparatus for recovering excess heat from a boiler exhaust gas stream.

2. Description of the Related Art

The discharge of combustion waste gases from industrial boilers into the atmosphere without treatment is highly objectionable. Waste gases commonly include waste heat, nitrogen oxides, and other corrosive products. Nitrogen oxides act as atmospheric pollutants, so that it is desirable to treat such combustion waste gases in order to eliminate the nitrogen oxides prior to discharge. It is also desirable to recapture some of the waste heat to improve the overall energy efficiency of the system.

U.S. Pat. No. 4,350,669 discloses a process for controlling nitrogen oxides in combustion exhaust gases. The process includes adding an oxygen-containing hydrocarbon, its precursor, or both to exhaust gases. The hydrocarbon or the precursor oxidizes nitric oxide in the exhaust gas to form nitrogen dioxide in the presence of oxygen. The process includes an economizer that includes a bundle of tubes that serve as baffles.

U.S. Pat. No. 3,699,748 discloses a wet dust collector or scrubber having an inertial separator section for removing a substantial percentage of the dust particles from the treated gas stream. The scrubber includes porous packing subjected to flushing liquid to produce a concentrated fog. The remaining dust particles are assimilated into the fog. A second separator section removes the wet dust particles from the gas stream. The collector also includes three frusto-conical baffles or funnels positioned within a tubular casing.

U.S. Pat. No. 4,380,529 discloses a tubular fixed bed hydroprocessing reactor. The reactor is a fixed bed reactor with two phase gas and liquid flow. The reactor has at least one auxiliary bed of solid particles disposed above the main bed of solid particles. The auxiliary bed has separate liquid and gas bypasses comprised, of hollow tubing extending through the auxiliary bed to a distributor tray. The reactor also includes a flow distributor having a plurality of fluid distribution tubes.

U.S. Pat. No. 5,516,499 discloses a method and apparatus for reducing volatile organic compound emissions from waste gases. The waste gas is treated in a thermal reactor and is contacted with a catalyzed surface device in the gas stream within a thermal oxidizer. The catalyzed surface device has a catalyzed surface which contacts the waste gas and further oxidizes the waste gas. The apparatus also includes a catalytically-active flow modification device that has a flow straightener.

U.S. Pat. No. 6,348,178 discloses a system for reducing NOx in exhaust gases. The system uses hydrocarbons to autoignite and autothermally heat an exhaust gas from an industrial process, so that ammonia or HNCO selectively reduce NOx autocatalytically.

U.S. Pat. Nos. 5,198,196 and 5,389,343 disclose tubular reactor towers having removable catalyst trays.

U.S. Pat. Nos. 7,097,814 and 7,303,730 disclose an apparatus for treating exhaust gas from boilers. The apparatus includes a baffle structure and a duct having a catalyst layer.

U.S. Pat. No. 5,061,467 discloses a method and apparatus for removing pollutants from flue gases. The apparatus includes a conventional horizontal duct with a circular cross section. The duct feeds into a funnel shaped gas flow distributor that. The distributor feeds into a rectangular shaped duct with an enlarged cross section. The apparatus also includes a baffled curtain wall and a catalyst.

U.S. Pat. No. 4,003,711 discloses an apparatus and method for eliminating nitrogen oxides from combustion waste gases by injecting ammonia therein. The apparatus includes a boiler, an economizer, and a reaction tower. The reaction tower includes a plurality of baffle plates spaced from each other along the central portion of the reaction tower. The reaction tower also includes catalysts, which are preferably an alumina carrier or a silica gel carrier that includes a layer of ferrous sulfate.

The above-described references illustrate that the use of catalysts to treat exhaust gases is well known. Several of the devices also include baffles for redirecting the flow of exhaust gases through reactor devices. However, there is a need to improve the performance of these reactor devices to use catalysts and baffles in a more efficient manner.

SUMMARY OF THE INVENTION

In accordance with the present invention there is provided a duct apparatus for treating exhaust gas. A tubular duct has a tapered portion with an opening for receiving the exhaust gas at one end and a straight portion at the opposite end. The tapered portion forms an air straightener having a plurality of baffles positioned therein. The straight portion has a heat recovery unit at one end and a catalyst tray positioned between the heat recovery unit and the air straightener. The air straightener baffles are arranged in a predetermined pattern to distribute the flow of exhaust gases uniformly through the catalyst tray into the heat recovery unit.

Further in accordance with the present invention, there is provided an apparatus for reducing the pressure drop across a boiler assembly. A tapered air straightener has an essentially round opening at one end for receiving exhaust gas from a boiler and a rectangular opening at the opposite end. A tubular section has an essentially rectangular interior cross section connected to the air straightener in fluid communication with the rectangular opening. The tubular section has a heat recovery unit and removable catalyst bed between the heat recovery unit and the air straightener. The air straightener has a plurality of baffles for forming an exhaust gas stream having an essentially uniform velocity along the tubular section rectangular interior cross section through the catalyst bed into the heat recovery unit.

Further in accordance with the present invention, there is provided a method for treating boiler exhaust gas. A catalyst tray is positioned between a heat recovery unit and a tapered tubular section having an essentially round opening at one end and an essentially rectangular opening at the opposite end. The exhaust gas is passed into the tapered tubular section round opening through a plurality of baffles positioned within the tapered tubular section to form a uniform gas stream. The gas stream is directed from the baffles to the tapered tubular section rectangular opening into the catalyst tray. The gas stream is conveyed from the catalyst tray to the heat recovery unit to remove waste heat from the gas stream.

Further in accordance with the present invention, there is provided an apparatus for treating boiler exhaust gas. A tubular air straightener has an essentially round opening at one end, an essentially rectangular opening at the opposite end, and a plurality of baffles positioned between the round opening and the rectangular opening. A catalyst assembly has a catalyst bed in fluid communication with the air straightener rectangular opening and an ammonia producing device for supplying ammonia to the catalyst bed. The air straightener directs exhaust gas from a boiler around the baffles to form a uniform exhaust gas stream for the catalyst bed. A heat recovery unit receives the uniform gas stream from the catalyst bed to remove waste heat for returning to the boiler.

Further in accordance with the present invention, there is provided a heating system. A boiler is in fluid communication with an economizer. The boiler produces a fluid stream containing heat therein and conveys the fluid stream to the economizer. The economizer receiving the fluid stream from the boiler and produces an exhaust gas stream. A feedwater heater in fluid communication with the economizer receives the exhaust gas stream. The feedwater heater has an air straightener with a plurality of baffles therein, a catalyst assembly, and a heat recovery unit. The feedwater heater directs the exhaust gas stream through the baffles to the catalyst assembly and conveys the exhaust gas stream from the catalyst assembly to the heat recovery unit. The heat recovery unit removes waste heat from the exhaust gas stream and transports the waste heat to the boiler.

Further in accordance with the present invention, there is provided a method for distributing heat. A boiler is heated to generate exhaust gas having a quantity of excess heat. The exhaust gas is conveyed to an economizer to remove a first portion of the quantity of excess heat. The exhaust gas is conveyed through a plurality of baffles within an air straightener to form an exhaust gas stream having an essentially uniform velocity in a flow direction. The exhaust gas stream is directed through a catalyst assembly into a heat recovery unit to remove a second portion of the excess heat from the exhaust gas.

Accordingly, a principal object of the present invention is to provide a heating system that removes contaminants and waste heat from a boiler exhaust gas stream.

Another object of the present invention is to provide a more efficient boiler system.

Another object of the present invention is to provide a heat recovery apparatus that includes a removable catalyst tray.

A further object of the present invention is to provide a waste heat recovery device that includes a more effective catalyst assembly.

These and other objects of the present invention will be more completely described and disclosed in the following specification, accompanying drawings, and appended claims.

DESCRIPTION OF THE PREFERRED EMBODIMENTS

Figure 1:
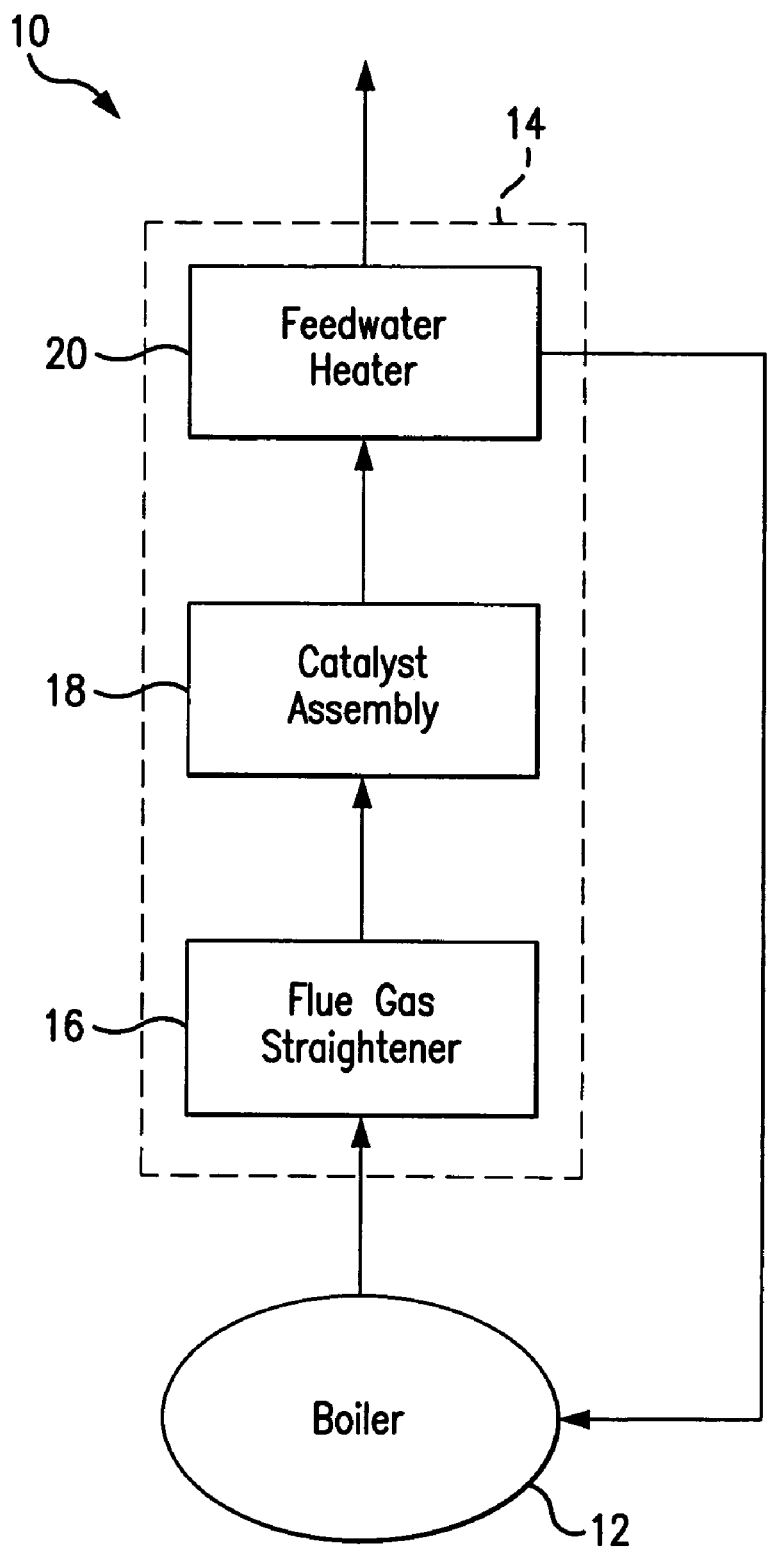
FIG. 1 is a schematic diagram of a heating system that includes a boiler and a heat recovery device.

Referring to the drawings and, particularly, to FIG. 1, there is illustrated a heating system generally designated by the numeral 10 that is used in various processes or heating applications. The heating system 10 includes a boiler 12 and a heat recovery device 14. The heat recovery device 14 is positioned in overlying relation with the boiler 12 to form a vertical stack.

The boiler 12 is in fluid communication with the heat recovery device 14 to facilitate the transfer of a fluid stream for treatment within the device 14. The heat recovery device 14 has the ability to remove waste heat and contaminants from the fluid stream, so that the treated fluid stream can be discharged into the external environment.

The boiler 12 is a suitable conventional gas fired boiler. Suitable boilers include boilers of the type associated with utility power plants or those designed to generate as little as 5 million BTU/hr (17 million Watts). The boiler 12 is conventional in design having a burner (not shown) and an outlet (not shown) that provides for the circulation of exhaust gases within the heating system 10.

It should be understood that the present invention is adaptable for use with a wide variety of boilers or chemical processes including utility boilers, major process boilers, liquor recovery boilers, as well as, smaller fired process heaters, process steam boilers, and nitric acid plants. Most boilers are used within heating systems that have 0.5 inches (12.7 mm) of pressure drop. Some boilers have a pressure drop as low as 0.2 inches (5.1 mm). The present invention is directed to a heating system in which the pressure drop of the boiler does not exceed 0.2 inches (5.1 mm).

The boiler 12 is the primary source of heat within the heating system 10. The heat recovery device 14 recovers waste heat from the boiler 12 exhaust stream for use within the heating system 10 to improve the overall efficiency of the system 10.

The heat recovery device 14 has the ability to remove contaminants from the exhaust gas stream using a suitable catalyst material. Preferably, the heat recovery device 14 removes nitrogen oxides and, optionally, sulfur oxides from the exhaust gas stream. The chemistry of nitrogen oxide and sulfur oxide is disclosed in U.S. Pat. Nos. 6,162,409, 5,316, 737, and 5,206,002, which are incorporated herein by reference.

The boiler 12 and the heat recovery device 14 are made from any suitable material through any suitable manufacturing process. Suitable materials include, but are not limited to, carbon steel, stainless steel, or cast iron. Preferably, the interior of the boiler 12 is lined with suitable insulating materials, such as refractories and the heat recovery device 14 is constructed from corrosive resistant materials.

As shown in FIG. 1, the heat recovery device 14 includes a flue gas or air straightener 16, a catalyst assembly 18, and a heat recovery unit 20 such as a feedwater heater or an economizer. The air straightener 16 is in fluid communication with the catalyst assembly 18 to facilitate the flow of exhaust gases from the boiler 12 to the catalyst assembly 18 for the removal of contaminants. The catalyst assembly 18 is in fluid communication with the heat recovery unit 20 to facilitate the removal of waste heat from the exhaust gas stream.

The catalyst assembly 18 and the heat recovery unit are positioned in overlying relation with the air straightener 16. The air straightener 16 redirects the flow of exhaust gases from the boiler 12 into the catalyst assembly 18. The air straightener 16 distributes the flow of exhaust gases uniformly through the catalyst assembly 18 into the heat recovery unit 20 to increase the efficiency of the catalyst materials contained therein.

Figure 2:
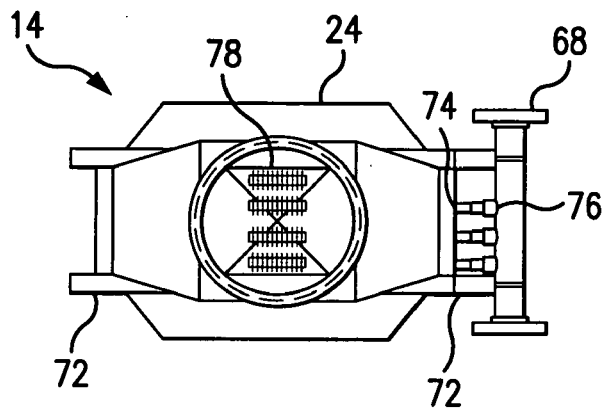
FIG. 2 is a top plan view of a heat recovery device.
Figure 3:
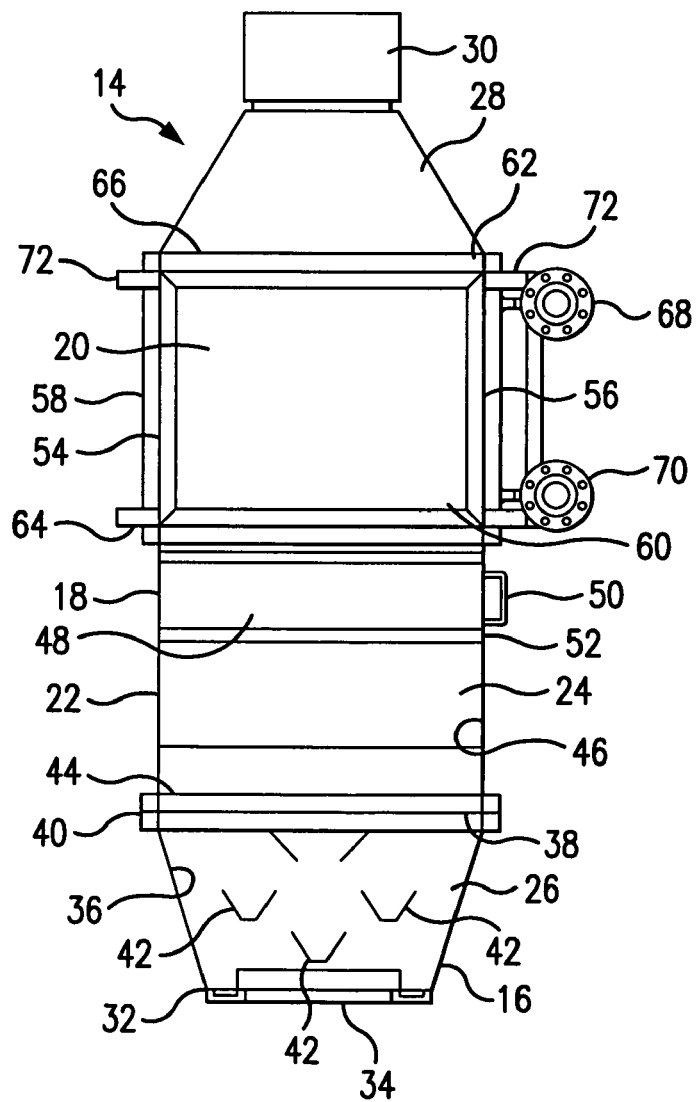
FIG. 3 is a front elevational view of the heat recovery device shown in FIG. 2.
Figure 4:
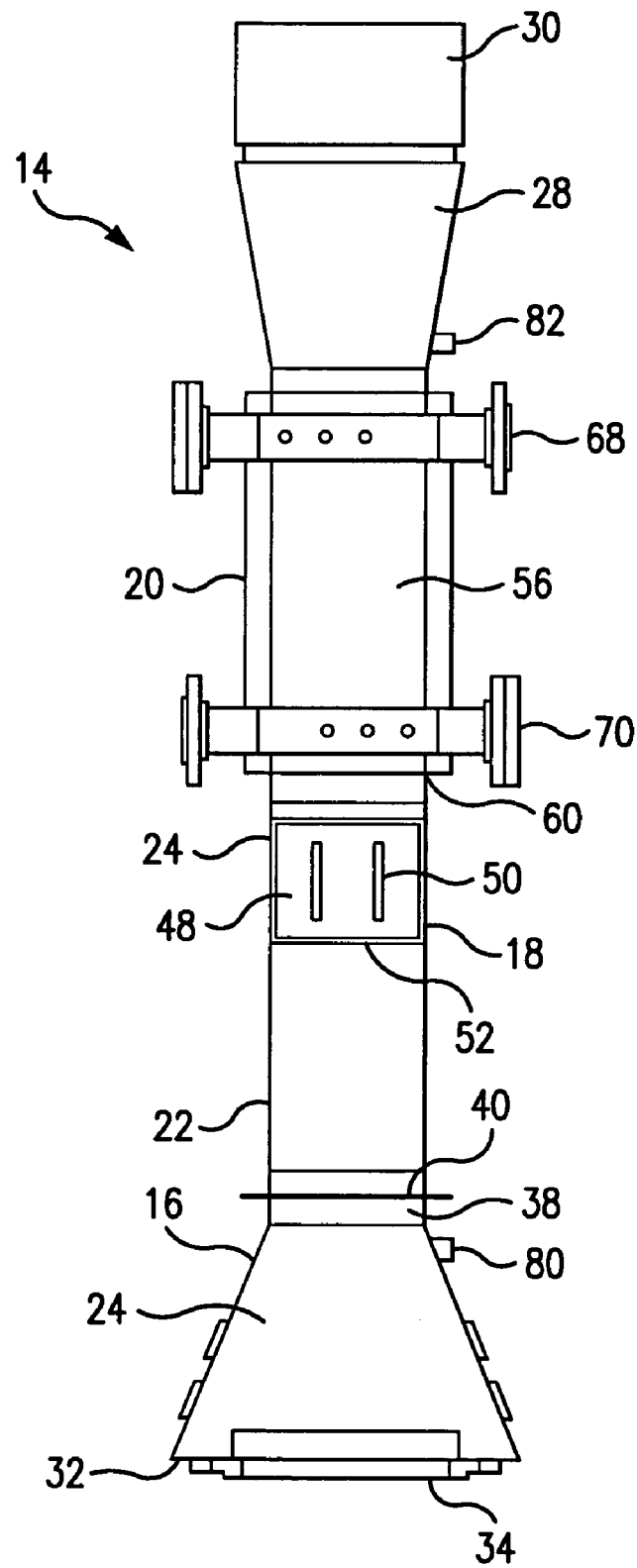
FIG. 4 is a side elevational view of the heat recovery device shown in FIG. 2.

Referring now to FIGS. 2-4, the heat recovery device 14 includes an essentially rectangular tubular body or duct 22 that holds the air straightener 16, catalyst assembly 18, and heat recovery unit 20. The duct 22 includes a straight portion 24 positioned between a bottom tapered portion 26 and a top tapered portion 28. The top tapered portion 28 includes a tubular conduit 30 for discharging exhaust gas from the heat recovery device 14.

The air straightener 16 is essentially integral with the bottom tapered portion 26. The air straightener 16 includes an external surface 32 that abuts a conduit (not shown) from the boiler 12 shown in FIG. 1. The surface 32 has an essentially round opening 34 that receives fluids from the boiler 12 and an internal cavity 36 that facilitates transport of the fluids into the straight portion 24.

The internal cavity 36 has a narrow, essentially circular cross section in the region adjacent to the opening 34. The internal cross section of the cavity 36 widens with increasing distance from the opening 34 and transitions to form a rectangular opening 38 at an end 40 adjacent to the straight portion 24. The opening 38 facilitates the transfer of fluids from the air straightener 16 to the straight portion 24.

The internal cavity 36 holds a plurality of baffles 42 within the air straightener 16. The baffles 42 are arranged in a predetermined pattern to redirect air flow within the cavity 36 to transition the flow pattern from an essentially circular cross section at the opening 34 to a rectangular cross section at the opening 38. The baffles 42 also collect flue gas condensation from the exhaust gas.

The straight portion 24 connects to the air straightener 16 with a conventional rectangular transition joint 44. The outer configuration of the straight portion 24 is essentially rectilinear with the outer dimensions remaining essentially unchanged from the bottom tapered portion 26 to the top tapered portion 28. The straight portion 24 includes an internal cavity 46 that holds the catalyst assembly 18 and the heat recovery unit or heat exchanger 20.

The straight portion 24, the bottom tapered portion 26, the top tapered portion 28, and the tubular conduit 30 are constructed from any suitable structural material or combination of materials using any suitable manufacturing process. Suitable structural materials include, but are not limited to, carbon steel, stainless steel, or cast iron.

As shown in FIGS. 2-4, the catalyst assembly 18 is positioned between the baffles 42 and the heat recovery unit 20. The baffles 42 are arranged in a manner that breaks up the flow of fluids from the boiler 12 shown in FIG. 1 to the heat recovery unit 20. The arrangement of the baffles 42 optimizes air flow by reducing a slight difference in air velocity through the catalyst assembly 18. The optimized air flow through the catalyst assembly 18 reduces dead spots therein, which increases the contaminant removal efficiency of the device 14.

The catalyst assembly 18 includes a suitable catalyst material for treating exhaust gas from the boiler 12 shown in FIG. 1. The selection of the catalyst materials depends upon the expected composition and the expected contaminants of the exhaust gas stream. Preferably, the exhaust gas stream is expected to contain NOx and the catalyst has the ability to remove NOx from the exhaust gas. The catalyst assembly 18 is operated under stoichiometric conditions, so that $N_2O$ is formed and destroyed, to minimize the concentration of NOx in the exhaust gas stream.

The catalyst assembly 18 includes a catalyst drawer or tray 48 for holding a quantity of catalyst. The catalyst drawer has a handle 50 for facilitating the manipulation. The straight portion 24 includes an opening 52 that accommodates the catalyst drawer 48. The catalyst drawer 48 has the ability to slide into and out of the straight portion 24 to facilitate the replacement or refreshment of the catalyst within the drawer 48.

As shown in FIGS. 2-4, the straight portion 24 is configured to accommodate the heat recovery unit 20. The straight section 24 includes a frame 54 for holding a front panel 56, a rear panel 58, and a pair of side panels 60, 62. The frame 54 connects to the straight portion 24 with a transition joint 64 and to the top tapered portion 28 with a transition joint 66. Preferably, the transition joints 64, 66 are factory sealed with universal caulking.

The rear panel 58 and the side panels 60, 62 are removable. The front panel 56 is not removable. Removal of the rear panel 58 or the side panels 60, 62 facilitates the inspection, cleaning, repair, and replacement of the components of the heat recovery unit 20.

The straight portion 24 includes an inlet tube 68 and an outlet tube 70 for providing fluids for heat transport to the heat recovery unit 20. The inlet tube 68 and the outlet tube 70 are in fluid communication with the heat recovery unit 20. The inlet tube 68 provides water to the heat recovery unit 20 for storing the waste heat that is recovered from the exhaust gas from the boiler 12 shown in FIG. 1. The outlet tube 70 conveys the water from the heat recovery unit 20 to recover the waste heat. Preferably, the outlet tube 70 returns the waste heat to the boiler 12.

As shown in FIGS. 2-4, the straight portion 24 includes a plurality of flanges 72 for holding the inlet tube 68 and the outlet tube 70. The flanges 72 include a plurality of tubular openings 74 that accommodate a plurality of compression fittings 76 that facilitate the flow of water from the inlet tube 68 to the heat recovery unit 20.

The heat recovery unit 20 is a heater core that features a plurality of extended surface finned tube elements 78. The finned tube elements 78 collect waste heat from the exhaust gases that flow through the feedwater heater body 22.

The heat-recovery unit 20 is in fluid communication with the inlet tube 68 and the outlet tube 70. The inlet tube provides water for circulation through the finned tube elements 78 to collect the waste heat. The heat recovery unit 20 returns the waste heat into the system 10 shown in FIG. 1 by directing water through the outlet tube 70. Preferably, the outlet tube 70 is in fluid communication with the boiler 12 to return the waste heat.

Referring now to FIG. 4, the feedwater heater body 20 includes a pair of instrument connections 80, 82 for facilitating the monitor and control of the system 10 shown in FIG. 1. The instrument connection 80 is positioned on the bottom tapered section 26. The instrument connection 82 is positioned on the top tapered section 28. Each instrument connection 80, 82 includes a protective cap.

Figure 6:
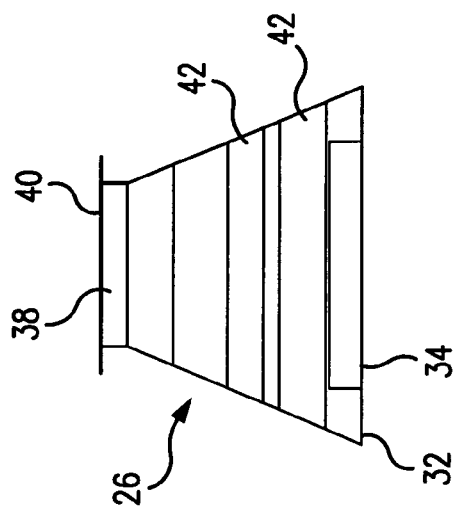
FIG. 6 is a side elevational view of the bottom transition section shown in FIG. 5.
Figure 5:
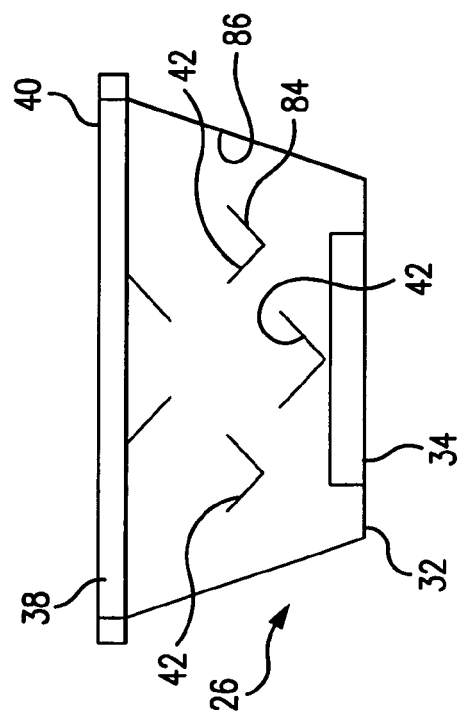
FIG. 5 is a front elevational view of a bottom transition section of the heat recovery device shown in FIGS. 2-4.

Referring now to FIGS. 5-6, the baffles 42 within the air straightener 16 are arranged in a predetermined pattern that optimizes the flow of exhaust gases through the heat recovery device 14. The arrangement of the baffles 42 provides the conventional boiler 12 shown in FIG. 1 with the ability to produce an exhaust gas stream that has reduced emissions of contaminants and waste heat.

The straightening unit 16 redirects air within the heat recovery device 14. Each baffle 42 includes at least one surface 84 that forms a predetermined angle with the surface 32 that abuts the boiler 12 shown in FIG. 1. The angle is selected to optimize exhaust gas flow from the air straightener to the catalyst assembly 18 shown in FIGS. 1-4. Preferably, the angle between the surface 84 and the surface 32 ranges from between 75 degrees and 90 degrees.

The air straightener baffles 42 are arranged in a manner that protects the refractories that line the interior of the boiler 12 shown in FIG. 1. The baffles 42 collect condensation from the exhaust gas and redirect the condensation to the air straightener walls 86. The walls 86 direct the condensation out of the air straightener 14 and into a sewer (not shown).

Figure 8:
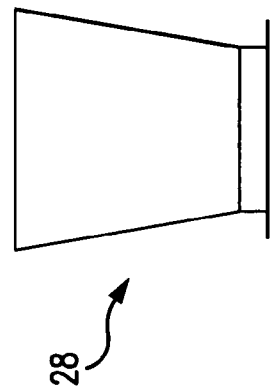
FIG. 8 is a side elevational view of the top transition section shown in FIG. 7.
Figure 7:
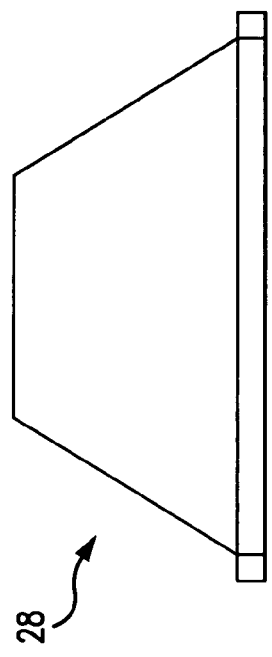
FIG. 7 is a front elevational view of a top transition section of the heat recovery device shown in FIGS. 2-4.

Referring now to FIGS. 7-8, the construction of the top tapered portion 28 is similar to the construction of the bottom tapered portion 26 shown in FIGS. 5-6. Contrary to the bottom tapered portion 26, the top tapered portion 28 does not include the internal baffles 42. The top tapered portion 22 also includes a tubular conduit 30 shown in FIG. 3.

Figure 9:
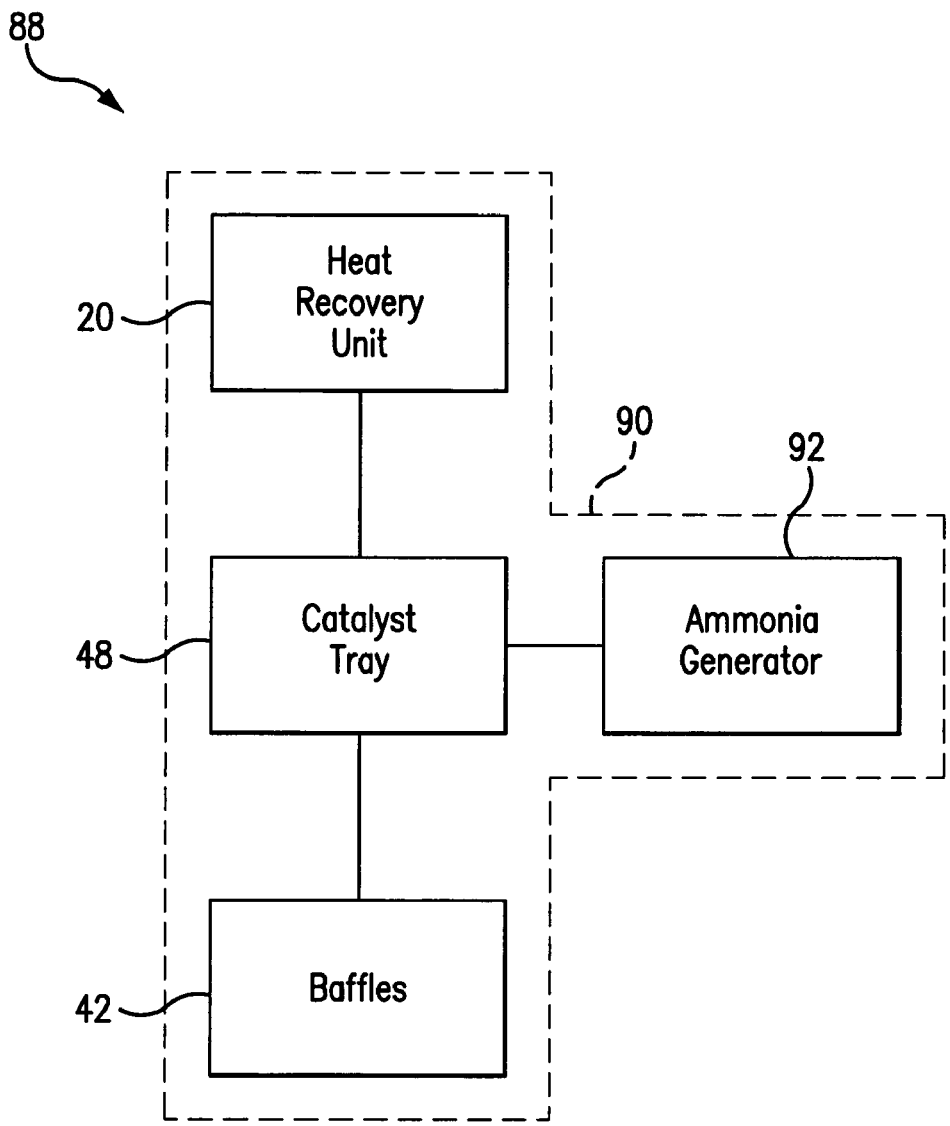
FIG. 9 is a schematic diagram of another embodiment of a heat recovery device.

Referring now to FIG. 9, there is shown another embodiment of a heat recovery device that is generally designated by the numeral 88 in which like elements are identified by like numerals shown in FIGS. 1-8. The heat recovery device 88 includes an air straightener 16 and a heat recovery unit 20. The heat recovery device 88 recovers waste heat and removes contaminants for the heating system 10 shown in FIG. 1.

Contrary to the embodiments shown in FIGS. 2-8, the heat recovery device 88 includes a catalyst assembly 90. The catalyst assembly 90 includes a removable catalyst drawer 48 and an ammonia production system 92. The ammonia production system distributes ammonia onto catalyst material within the catalyst drawer 48 by spraying.

The catalyst assembly 90 includes suitable catalyst materials that utilize ammonia generated by the ammonia production system 92 to remove contaminants within the heat recovery device 14. The heat recovery device 14 consumes the ammonia that is produced by the ammonia system 92 to produce an exhaust stream that does not include ammonia.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A duct apparatus for treating exhaust gas comprising:
a tubular duct having a tapered portion with an opening for receiving the exhaust gas at one end and a straight portion at the opposite end,
said tapered portion forming an air straightener having a plurality of baffles positioned therein,
said straight portion having a heat recovery unit at one end and a catalyst tray positioned between said heat recovery unit and said air straightener, and
said baffles being arranged in a predetermined pattern in said air straightener to redirect the flow of exhaust gases from said tubular duct opening through said catalyst tray into said heat recovery unit.

2. A duct apparatus as set forth in claim 1 which includes:
said catalyst tray being a removable catalyst tray.

3. A duct apparatus as set forth in claim 1 which includes:
said tapered portion having an essentially circular cross section at one end defining said opening and an essentially rectangular cross section for communicating with said straight portion at the opposite end.

4. A duct apparatus as set forth in claim 3 in which:
each baffle includes at least one surface that forms an angle of between 75 degrees and 90 degrees relative to said tapered portion circular cross section.

5. A duct apparatus as set forth in claim 1 in which:
said baffles being arranged to prevent liquid from condensing in said air straightener and flowing through said opening.

6. A duct apparatus as set forth in claim 1 in which:
said straight portion includes a catalyst assembly for holding said catalyst tray.

7. A duct apparatus as set forth in claim 6 in which:
said catalyst assembly includes means for distributing ammonia.

8. A duct apparatus as set forth in claim 1 in which:
said catalyst bed includes a catalyst having the ability to remove NOx.

9. An apparatus for reducing the pressure drop across a boiler assembly comprising:
a tapered air straightener having an essentially round opening at one end for receiving exhaust gas from a boiler and a rectangular opening at the opposite end,
a tubular section having an essentially rectangular interior cross section connected to said air straightener in fluid communication with said rectangular opening,
said tubular section having a heat recovery unit and removable catalyst bed between said heat recovery unit and said air straightener, and
said air straightener having a plurality of baffles for forming an exhaust gas stream having an essentially uniform velocity along the tubular section rectangular interior cross section through said catalyst bed into said heat recovery unit.

10. An apparatus as set forth in claim 9 which includes:
said baffles being arranged to prevent liquid from condensing in said air straightener and flowing through said round opening into the boiler.

11. An apparatus as set forth in claim 9 in which:
said catalyst tray includes a catalyst having the ability to remove NOx.

12. An apparatus as set forth in claim 9 in which:
said tubular section includes a catalyst assembly for holding said catalyst tray.

13. An apparatus as set forth in claim 12 in which:
said catalyst assembly includes means for distributing ammonia.

14. An apparatus as set forth in claim 9 in which:
each baffle includes at least one surface that forms an angle of between 75 degrees and 90 degrees relative to said air straightener essentially round opening.

15. A method for treating boiler exhaust gas comprising:
positioning a catalyst tray between a heat recovery unit and a tapered tubular section having an essentially round opening at one end and an essentially rectangular opening at the opposite end,
passing the exhaust gas into the tapered tubular section round opening through a plurality of baffles positioned within the tapered tubular section to form a uniform gas stream,
directing the gas stream from the baffles to the tapered tubular section rectangular opening into the catalyst tray, and
conveying the gas stream from the catalyst tray to the heat recovery unit to remove waste heat from the gas stream.

16. A method as set forth in claim 15 which includes:
removing NOx from the exhaust gas with the catalyst tray.

17. A method as set forth in claim 16 which includes:
distributing ammonia in the catalyst tray.

18. A method as set forth in claim 15 which includes:
heating a boiler to generate exhaust gas having a quantity of excess heat, and
conveying the exhaust gas to the tapered tubular section for transport to the heat recovery unit to remove the excess heat.

19. A method as set forth in claim 18 which includes:
arranging the baffles in a predetermined pattern to prevent condensation from leaking into the boiler through the round opening.

20. A method as set forth in claim 18 which includes:
arranging the baffles so that each baffle has at least one surface that forms an angle of between 75 degrees and 90 degrees with the tapered tubular section essentially round opening.

21. An apparatus for treating boiler exhaust gas comprising:
an air straightener having an essentially round opening at one end, an essentially rectangular opening at the opposite end, and a plurality of baffles positioned between said round opening and said rectangular opening,
a catalyst assembly having a catalyst bed in fluid communication with said air straightener rectangular opening and an ammonia distributing device for supplying ammonia to said catalyst bed,
said air straightener directing exhaust gas from a boiler around said baffles to form a uniform exhaust gas stream for said catalyst bed, and
a heat recovery unit receiving the uniform gas stream from said catalyst bed to remove waste heat for returning to the boiler.

22. An apparatus as set forth in claim 21 in which:
said catalyst assembly includes a removable catalyst bed.

23. An apparatus as set forth in claim 21 which includes:
said baffles being arranged to prevent liquid from condensing in said air straightener and flowing through said round opening into the boiler.

24. An apparatus as set forth in claim 21 in which:
said catalyst bed includes a catalyst having the ability to remove NOx.

25. An apparatus as set forth in claim 21 which includes:
said baffles each having a surface positioned at a predetermined angle relative to said round opening of said air straightener.

26. An apparatus as set forth in claim 21 in which:
each baffle includes at least one surface that forms an angle of between 75 degrees and 90 degrees relative to said air straightener round opening.

27. A heating system comprising:
a boiler,
a heat recovery device in fluid communication with said boiler,
said boiler producing a fluid stream containing heat therein and conveying the fluid stream to said heat recovery device,
said heat recovery device having an air straightener with a plurality of baffles therein, a catalyst assembly, and a feedwater heater,
said heat recovery device directing the exhaust gas stream through said baffles to said catalyst assembly and conveying the exhaust gas stream from the catalyst assembly to said feedwater heater, and
said feedwater heater removing waste heat from the exhaust gas stream and transporting the waste heat to said boiler.

28. A heating system as set forth in claim 27 which includes:
said air straightener having an essentially round opening at one end in fluid communication with said boiler and an essentially rectangular opening in fluid communication with said catalyst assembly.

29. A heating system as set forth in claim 27 which includes:
said air straightener baffles being arranged to provide an essentially uniform gas stream flowing through said rectangular opening into said catalyst assembly.

30. A heating system as set forth in claim 29 which includes:
said air straightener baffles arranged to prevent condensation from leaking through said round opening into said boiler.

31. A heating system as set forth in claim 27 which includes:
each air straightener baffle includes at least one surface that forms an angle of between 75 degrees and 90 degrees relative to said air straightener round opening.

32. A heating system as set forth in claim 27 in which:
said catalyst assembly includes a removable catalyst bed.

33. A heating system as set forth in claim 32 in which:
said catalyst bed includes a catalyst having the ability to remove NOx.

34. A heating system as set forth in claim 27 in which:
said catalyst assembly includes means for holding a catalyst and means for distributing ammonia.

35. A heating system as set forth in claim 27 which includes:
said heat recovery device being in an overlying relationship with said feedwater heater to form a vertical stack.

36. A heating system as set forth in claim 35 which includes:
said air straightener baffles arranged to prevent condensation from leaking into said boiler.

37. A duct apparatus for treating an exhaust gas stream comprising:
a tubular duct having a tapered portion with an opening for receiving the exhaust gas at one end and a straight portion at the opposite end,
said straight portion having a catalyst tray for removing contaminants from the exhaust gas stream,
said tapered portion having a plurality of baffles for redirecting the flow of the exhaust gases within the exhaust gas stream into said straight portion and through said catalyst tray, and
said baffles being arranged in a predetermined pattern to distribute the flow of exhaust gases uniformly through said catalyst tray.

38. A duct apparatus as set forth in claim 37 which includes:
said catalyst tray being a removable catalyst tray.

39. A duct apparatus as set forth in claim 37 which includes:
said tapered portion having an essentially circular cross section at one end defining said opening and an essentially rectangular cross section for communicating with said straight portion at the opposite end.

40. A duct apparatus as set forth in claim 39 in which:
each baffle includes at least one surface that forms an angle of between 75 degrees and 90 degrees relative to said tapered portion circular cross section.

41. A duct apparatus as set forth in claim 37 in which:
said baffles being arranged to prevent liquid from condensing in said air straightener and flowing through said opening.

42. A duct apparatus as set forth in claim 37 in which:
said straight portion includes a catalyst assembly for holding said catalyst tray.

43. A duct apparatus as set forth in claim 42 in which:
said catalyst assembly includes means for distributing ammonia.

44. A duct apparatus as set forth in claim 37 in which:
said catalyst bed includes a catalyst having the ability to remove NOx.

* * * * *